(12) United States Patent
von Rothkirch und Panthen et al.

(10) Patent No.: US 8,585,150 B2
(45) Date of Patent: Nov. 19, 2013

(54) CENTER CONSOLE WITH LINEAR GUIDE

(75) Inventors: Eberhard von Rothkirch und Panthen, Sommerach (DE); Thomas Hessdörfer, Karlstadt (DE); Michael Winterstein, Schernau (DE)

(73) Assignee: F.S. Fehrer Automotive GmbH, Kitzingen (DE)

( * ) Notice: Subject to any disclaimer, the term of this patent is extended or adjusted under 35 U.S.C. 154(b) by 234 days.

(21) Appl. No.: 13/176,463

(22) Filed: Jul. 5, 2011

(65) Prior Publication Data
US 2012/0049601 A1    Mar. 1, 2012

(30) Foreign Application Priority Data
Aug. 31, 2010 (DE) .......................... 10 2010 036 000

(51) Int. Cl.
*B60N 2/46* (2006.01)
(52) U.S. Cl.
USPC ............. 297/411.37; 297/411.21; 297/411.35
(58) Field of Classification Search
USPC .......................... 297/411.21, 411.35, 411.37
See application file for complete search history.

(56) References Cited

U.S. PATENT DOCUMENTS

| | | | |
|---|---|---|---|
| 6,203,088 B1 * | 3/2001 | Fernandez et al. | 296/37.8 |
| 7,077,468 B2 * | 7/2006 | Maierholzner | 297/188.19 |
| 7,186,118 B2 * | 3/2007 | Hansen et al. | 439/34 |
| 7,641,284 B2 * | 1/2010 | Jones et al. | 297/411.2 |
| 7,766,408 B2 * | 8/2010 | Lota et al. | 296/37.1 |
| 2006/0279123 A1 * | 12/2006 | Bazinski et al. | 297/411.35 |
| 2007/0114829 A1 * | 5/2007 | Wieczorek et al. | 297/411.35 |

FOREIGN PATENT DOCUMENTS

| | | |
|---|---|---|
| DE | 102004057714 A1 | 6/2006 |
| DE | 102006057226 A1 | 6/2007 |

* cited by examiner

*Primary Examiner* — Philip Gabler
(74) *Attorney, Agent, or Firm* — Quarles & Brady LLP

(57) ABSTRACT

The present invention relates to a device (01, 22) for use in the interior of a vehicle, comprising a first and a second carrier element (02, 23, 03, 24) and a connecting linear guide, wherein the first carrier element (02, 23) features two linearly extending first guiding surfaces (06, 07, 27, 28) and the second carrier element (03, 24) features two first abutment surfaces (12, 13, 33, 34), wherein the carrier elements (02, 23, 03, 24) are longitudinally displaceable relative to each other when the abutment surfaces (12, 13, 33, 34) slide along the guiding surfaces (06, 07, 27, 28), and wherein the linear guide produces a clamping effect which prevents self-actuated displacement of a carrier element (02, 23, 03, 24) due to vehicle movements, wherein the linear guide further features a second guiding surface (08, 29) being associated with the first carrier element (02, 23) and features a second abutment surface (14, 35) being associated with the second carrier element (03, 24), wherein, when the first and the second carrier elements (02, 23, 03, 24) are fitted together, elastic deformation of the first and/or the second carrier element (02, 23, 03, 24) is realized at least in some regions, causing the first and the second abutment surfaces (12-14, 33-35) to be pressed against the first and the second guiding surfaces (06-08, 27-29).

14 Claims, 4 Drawing Sheets

CENTER CONSOLE WITH LINEAR GUIDE

CROSS-REFERENCE TO RELATED APPLICATIONS

The present application claims the benefit of German Patent Application No. 10 2010 036 000.7 filed Aug. 31, 2010, which is fully incorporated herein by reference.

The present invention relates to a device for use in the interior of a vehicle, comprising two carrier elements which are connected by means of a linear guide.

From the state of the art, many different types of linear guide systems are known. However, in the interior of a vehicle only a limited number of systems are used. This is in particular due to the requirements with respect to low weight, low costs and provision of the required stability and long service life.

In the state of the art, in particular in the field relating to the use of longitudinally displaceable arm rests at center consoles, rod guides are routinely employed. These widely known systems are based on a first carrier element which exhibits sliding seats and is typically fixedly or else swivelably connected to the center console. Here, metal rods are longitudinally displaceably mounted in the sliding seats. Said metal rods, in turn, are fixedly connected to a second carrier element which at the same time constitutes the supporting component of the moveable arm rest. Designing the sliding seats of felt or the like in combination with a geometrical overlap with the metal rods produces a clamping effect in the linear guide, hence causing a damped movement. Thus, it is ensured that unwanted displacement of the console component is prevented during vehicle maneuvers.

Although this embodiment has proven perfectly suitable, the high weight of the metal rods still constitutes a drawback. Said metal rods make up a significant part of the total weight of the center console, wherein the remainder thereof is essentially composed of plastics.

Consequently, it is an object of the present invention to suggest a linear guide for use in the interior of a vehicle, wherein in particular weight can be considerably reduced compared to the state of the art.

This object is attained by an inventive device according to claim 1.

Advantageous embodiments are the subject-matter of the subclaims.

A generic device serves for use in the interior of a vehicle. The intended purpose is initially optional provided that longitudinal displaceability of an element is required. Here, the device comprises a first and a second carrier element as well as a connecting linear guide. A deviation from a perfectly rectilinear movement of the linear guide is not detrimental to the inventive effect. Hence, a circular movement would also be implementable, wherein the movement from one end to the other end extends only over a small angular range, i.e. the arc length between the terminal points of the possible movement is only slightly larger than the direct distance between the two terminal points. However, as a general rule, the movement will conform to a straight line.

In this regard, the carrier elements on the one hand can each be designed so as to fulfill only the linear guiding function. By the same token, it is possible to integrate further functions into one carrier element, respectively into the carrier elements. In a longitudinally displaceable arm rest of a center console, one carrier element may thus at the same time form the arm support, and the other carrier element may be provided with a swivel bearing for connection to the center console being affixed to the vehicle.

The first carrier element of the device generically features two linearly extending first guiding surfaces. However, it is irrelevant with respect to the inventive embodiment if the respective first guiding surface is not completely continuous. Instead, a first guiding surface may feature one or more discontinuities, for instance grooves. The essential design, however, corresponds to a continuous guiding surface. Here, the configuration of the respective guiding surface transversal to the moving direction is immaterial and initially optional, for instance may be of a circular or else of a straight design.

The second carrier element of the device features two first abutment surfaces. In this context, the configuration of the abutment surface in turn is initially secondary. Said abutment surface may be composed both of one individual closed surface and equally of a plurality of interspaced partial surfaces, and may be shorter or else longer in the moving direction. To enable stable positioning of the carrier elements with respect to each other, as a rule, two interspaced partial surfaces are each used as an abutment surface, wherein the partial surfaces are primarily short in relation to the distance between them.

Here, it is essential that the carrier elements are longitudinally displaceable relative to each other when the abutment surfaces slide along the guiding surfaces. This means that when the first carrier element is stationary, the abutment surface moves along the stationary guiding surface when the second carrier element is displaced, wherein the abutment surfaces are contacted with the respective guiding surfaces.

Moreover, the linear guide produces a clamping effect which prevents self-actuated displacement of a carrier element with respect to the other carrier element due to vehicle movements. A self-actuated displacement is caused in the absence of a clamping effect by the mass inertia of the carrier element and associated elements being movable with respect to the vehicle due to acceleration forces resulting from driving maneuvers. Although any guiding action always produces a minimal amount of friction, in the device provision is made for the resulting friction being sufficiently high to prevent unwanted displacement. In the case of the center console this means that the longitudinally moveable arm support of the center console is not displaced with respect to the components of the center console being affixed to the vehicle without any intervention.

Moreover, the device is generically designed such that the user is enabled to cause a carrier element to be displaced relative to the other carrier element. In this regard, it is irrelevant whether both carrier elements are still mounted in the vehicle as a unit, for example again in a pivotable fashion.

According to the invention, the linear guide features a second guiding surface being associated with the first carrier element, and features a second abutment surface being associated with the second carrier element. Hence, the first carrier element comprises two first guiding surfaces and one second guiding surface, and the second carrier element comprises two first abutment surfaces and one second abutment surface. By the same token, as is the case for the first guiding surfaces and the first abutment surfaces, the second guiding surface, respectively the second abutment surface may be composed of partial surfaces.

It is essential in the inventive solution, when the first and the second carrier elements are fitted together, that elastic deformation of the first and/or the second carrier element is realized at least in some regions. This means that, when the elements are fitted together, at least one carrier element needs to be deformed. Said elastic deformation further leads to the first and the second abutment surfaces being pressed against the first and second guiding surfaces. Hence, the first and the second carrier elements are continuously subjected to prestressing, whereas compressive stresses are exerted in the guiding contact.

The inventive solution makes it possible for the first time to realize a stable supporting connection between two carrier elements and, as required, to thereby prevent self-actuated displacement of the carrier elements with respect to each other. Thus, the required metal rods known from the state of the art can be dispensed with, making it possible to achieve a considerable weight reduction.

The terms guiding surface and abutment surface in this context are supposed to refer to geometrical surfaces of an initially optional design and may each be composed of several partial surfaces, wherein the interaction between the guiding surface and the abutment surface defines the linear guide.

It is particularly advantageous to design the carrier elements such that in a non-deformed state, a geometrical overlap is produced. This is supposed to mean that in a geometric model, e.g. a CAD model, the non-deformed carrier elements are positioned so as to come into contact with the second abutment surface and the second guiding surface. In this state, the respective first abutment surface overlaps with the associated guiding surface. Hence, in the case of a corresponding assembly of the real carrier elements, it is apparent that at least one carrier element is required to be deformed by the degree of said overlap. The degree of overlap shall be determined subject to several factors. Here, on the one hand manufacturing tolerances need to be taken into consideration. Moreover, it is in particular necessary to take into consideration the elasticity of the carrier elements.

When the carrier elements are embodied as plastic components to be used in an arm rest, it is particularly advantageous to select the degree of overlap in a range for instance between 0.1 mm and 0.5 mm. The selection of a corresponding degree of overlap is particularly suitable, since on the one hand the necessary clamping effect is produced, which prevents self-actuated displacement of the carrier elements with respect to each other, and on the other hand manufacturing tolerances can be absorbed. Thus, in the real component, the degree of overlap should be within said corresponding range.

Moreover, for producing the pre-stress, respectively the elastic deformation of the at least one carrier element, it is apparent that it is particularly advantageous to place the second guide between the two first guides.

In an advantageous embodiment, essentially planar first guiding surfaces are selected. Here, the two first guiding surfaces are advantageously positioned in a common plane.

Positioning both guiding surfaces in one plane gives rise to a simplified configuration with respect to construction and production of the carrier elements, since use is made of the symmetrical properties and the simple designs. Moreover, alignment of the first guiding surfaces with respect to each other is simplified in an injection molded component serving as a first carrier element if the same lie in one plane.

According to the inventive embodiment comprising two first guiding surfaces and one second guiding surface, according to a particularly advantageous embodiment, the second guiding surface is geometrically positioned between the two first guiding surfaces. In a theoretically simplified model, wherein all guiding surfaces lie in one plane, it is apparent that a compressive force exerted on the first guiding surfaces acts upon the second guiding surface in the opposite direction. Here, it is apparent that the directions of force, due to the optional design of the guiding surfaces, are shifted transversal to the moving direction when the guiding surfaces are for instance obliquely arranged.

Advantageously, the second guiding surface is realized in one piece or else in multiple pieces having a V-shape or a trough shape or else having a shape being complementary thereto. A design being correspondingly realized enhances the centering effect of the linear guide with respect to the position of the two carrier elements relative to each other. For this purpose, the second guiding surface arranged between the first guiding surfaces is particularly suitable, since tolerances in the carrier elements essentially have no impact on the position of the carrier elements relative to each other and equally only have a minimal impact on the clamping effect.

Moreover, it is particularly advantageous if two planar partial surfaces being disposed at an angle with respect to each other form the second guiding surface. Here again the partial surfaces in the moving direction may equally be realized continuously or else with a multiple piece design. The second guiding surface configured in a V-shape and composed of two partial surfaces, in turn, is particularly simple in terms of production. Moreover, planar surfaces are particularly suitable for aligning the carrier elements with respect to each other.

Concerning the cost factor, weight reduction and recyclability it is particularly advantageous if the carrier elements are essentially completely composed of plastics. In that context, the carrier elements encompass the relevant region of the linear guide. Here, it is immaterial whether the individual carrier elements comprise other components or elements which do not belong to the linear guide and which are not made of plastics. Hence, the carrier elements made of plastics concern the linear guide and the functionally essential elastic deformation of said carrier elements.

Moreover, it is advantageous if the first carrier element comprising the guiding surfaces is composed of a uniform plastic material. Hence, the first carrier element can be produced in a so-called 1K injection molding process. Consequently, production of said component is particularly cost-efficient and neither necessitates subsequent assembly steps to form a carrier element nor a multi-component injection molding process.

For attaining the advantageous sliding properties with respect to hold in all vehicle movements as well as easy operability on the part of the user, it is particularly advantageous if the abutment surfaces at the second carrier element are each formed by one or else by a plurality of sliding pads. Here, the sliding pads are supposed to constitute sliding elements which are made of a material differing from the rest of the carrier element, and which are specifically selected for the sliding properties. Hence, the sliding pads can be produced with a low material thickness of a special plastic material. On the one hand, it is possible to produce the second carrier element jointly with the sliding pads in a multi-component injection molding process. By the same token, the sliding pads can be provided in the injection molding process of the second carrier part in the form of inserts. Alternatively, the sliding pads can also be mounted, adhesively bonded or else welded thereto.

In consideration of an acceptable degree of wear and tear, it is particularly advantageous if the second carrier element, just like the first carrier element, is respectively made of one material. Hence, the complex application of individual sliding pads can be omitted. In this case, the selection of a material being advantageous with respect to wear and tear due to the movement of the linear guide while providing good sliding properties is required for the material combination between the first and the second carrier element.

It is also particularly advantageous if the linear guide at the first carrier element of each first guiding surface in each case features a third guiding surface, i.e. two third guiding surfaces, and at the second carrier element in each case features a third abutment surfaces, i.e. two third abutment surfaces. Here, the first and the third guiding surfaces have a primarily opposed alignment with respect to each other. In the simplest manner, the first and the third guiding surfaces are designed plane-parallel and opposed to each other. By the same token, it is also possible to arrange the same at an angle with respect to each other, wherein the normal vectors of the respective guiding surfaces form an angle to each other greater than 90°, in particular greater than 120°.

Depending on the intended use, for instance for an arm rest of a center console, various stresses are exerted on the carrier elements. In this context, inter alia another elastic deformation may occur in at least one carrier element in particular due to unilateral external stresses. As a result, a first abutment surface may be lifted off the corresponding guiding surface. Although this is initially uncritical, damage and lasting deformations need to be prevented in the carrier elements. Thus, it is advantageous to limit the further elastic deformation of the carrier elements by bringing the third abutment surface into abutment with the third guiding surface. In this context, the carrier elements need to be configured such that the limited further elastic deformation is overcome without any damage being caused.

For this purpose, it is particularly advantageous if a gap, in particular between 0.1 mm and 0.5 mm, is provided between the third guiding surface and the respective third abutment surface when no additional stresses are exerted on the carrier elements. The selection of this gap makes it possible to ensure that an unwanted clamping effect is not produced between the first and the third contact point. Equally, said gap provides sufficient protection against tolerance variations in the real component.

As a consequence, the frictional force produced between the first and the second carrier element can be kept in an appropriate range such that even in the case of unilateral stresses, displacement by the driver, respectively the passenger, is rendered possible.

Use of the device in a center arm rest for a longitudinally displaceable arm support is particularly advantageous.

Hence, the driver is enabled to vary the position of the arm support using the device, i.e. to displace it forward or else backward. Here, the device provides the necessary hold of the arm support to prevent unwanted movements due to acceleration or deceleration processes. The possible high stability of the device also ensures sufficient stability over the vehicle's entire service life.

The following figures schematically illustrate possible embodiments of an inventive linear guide with reference to an example.

Figure 6:
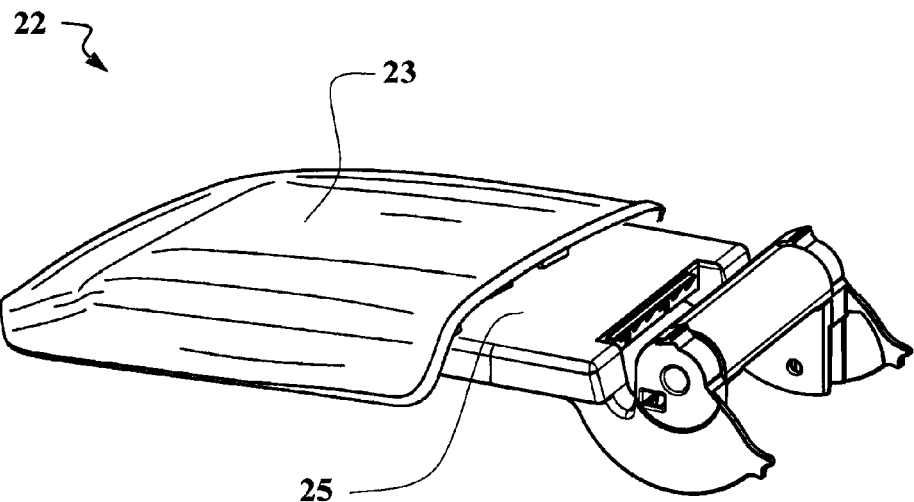
FIG. 6 shows an example of a center arm rest 22 comprising a linear guide.
Figure 8:
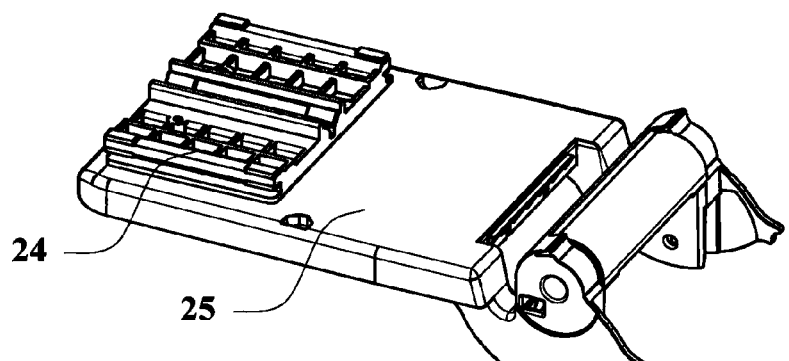
Figure 9:
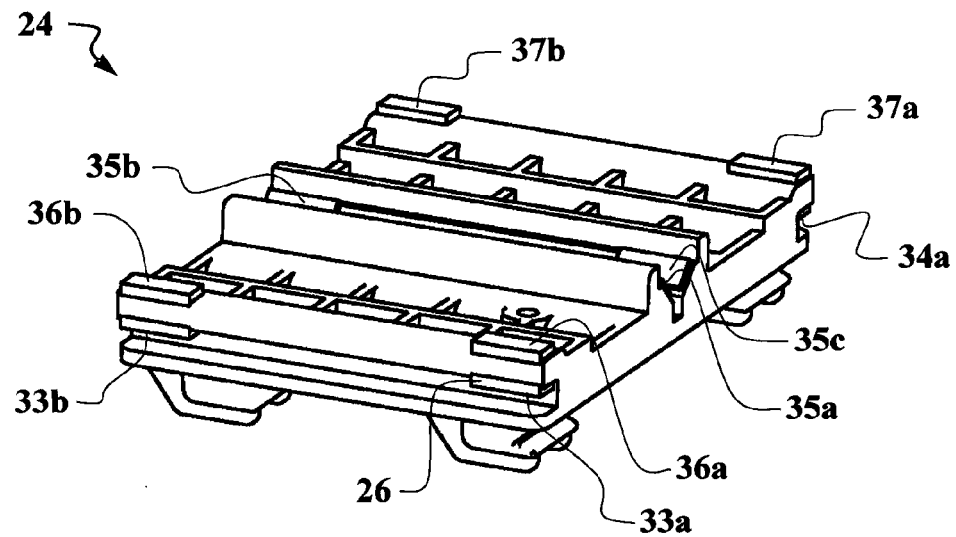
Figure 10:
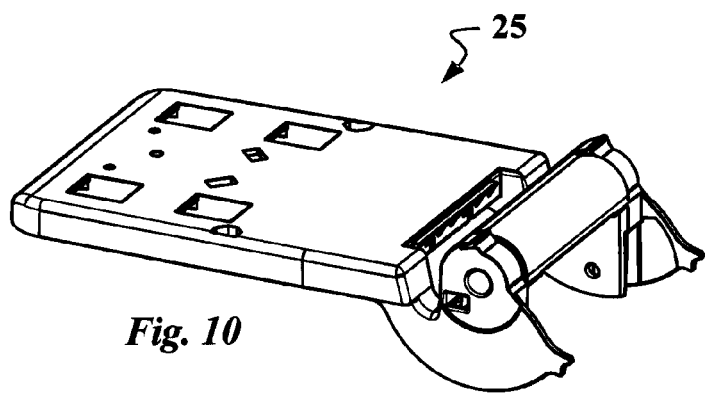

FIG. 8 shows the console 25 comprising the second carrier element 24 of the center arm rest 22 according to FIG. 6;

FIG. 9 shows the second carrier element 24 of the embodiment according to FIG. 6;

FIG. 10 shows a swivelable console 25 of the embodiment according to FIG. 6.

Figure 1:
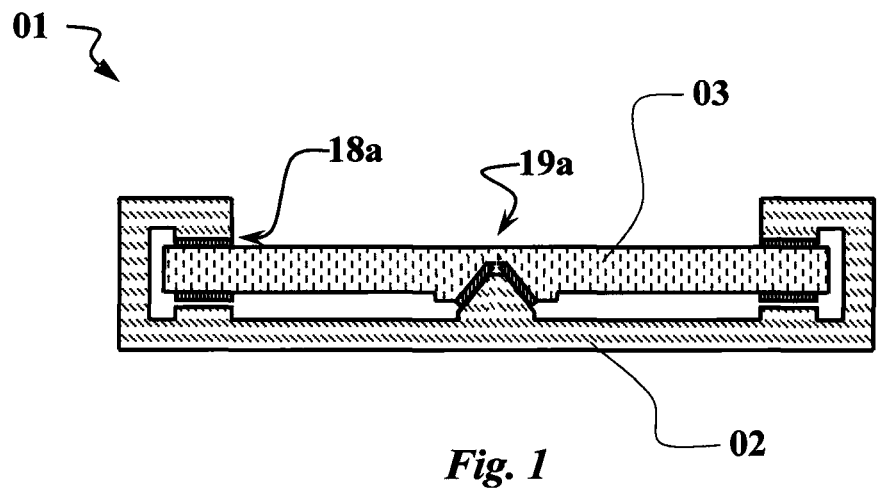
FIG. 1 shows a simplified schematic view of a possible device 01 comprising an inventive linear guide with two carrier elements 02, 03 in a lateral view.

FIG. 1 schematically illustrates the arrangement of the first carrier element 02 and the second carrier element 03 in a simplified exemplary embodiment of the inventive device 01. The arrangement of the carrier elements 02, 03 in FIG. 1 neglects the resulting collision of the real components. In the inventive embodiment, the linear guide provided between the carrier elements 02, 03 in a geometric model results in a first guiding contact 18a producing a geometrical overlap between the first and the second carrier element. Equally, an overlap is produced in the second guiding contact 19a. It is apparent that the linear guide is initially composed of two first guiding contacts 18 and one second guiding contact 19 situated in the center.

Figure 2:
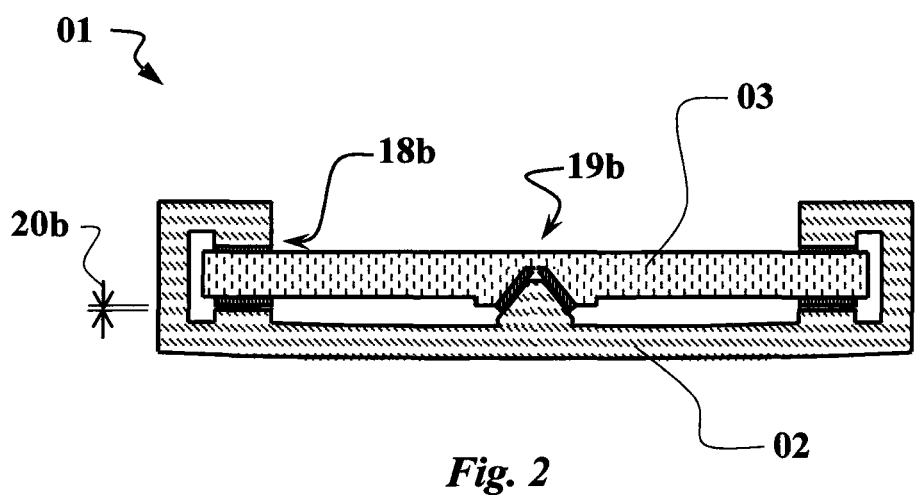
FIG. 2 shows the deformation of a carrier element 02 in an assembled state according to the view of FIG. 1.

FIG. 2 shows the state during assembly of the first carrier element 02 with the second carrier element 03. Deformation of at least one carrier element 02, 03 is realized. In the illustrated example, the deformation of the first carrier element 02 is apparent. Here, a contact is produced in the guide, respectively an abutment is realized between the two carrier elements 02, 03 in the first guiding contacts 18b as well as in the second guiding contact 19b. It is apparent that the elastic deformation of at least one carrier element 02, 03 in turn leads to compressive stresses being exerted in the first or in the second guiding contact 18b, 19b of the linear guide. As a result, a sufficient clamping effect is produced, which in turn ensures that a carrier element 02, respectively 03, is not allowed to inadvertently become displaced with respect to the other carrier element 03, respectively 02. Moreover, FIGS. 1 and 2 render apparent the particularly simple design of said linear guide. Furthermore, FIG. 2 illustrates that the linear guide comprises a third guiding contact, wherein in the illustrated state a gap is provided between the two carrier elements 02, 03 in the third guiding contact 20b.

Figure 3:
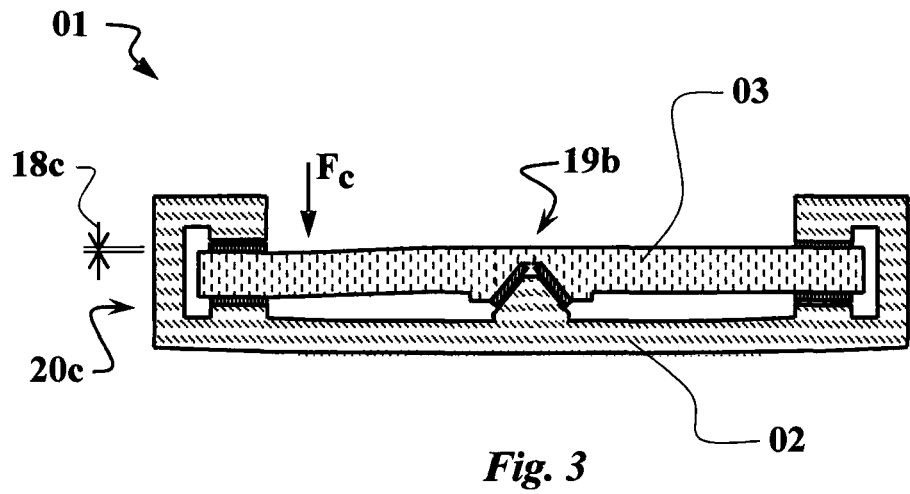
FIG. 3 shows the deformation of a carrier element 03 upon application of additional stresses Fc according to the view of FIG. 2.

FIG. 3 according to the embodiments of FIGS. 1 and 2 exemplarily illustrates unilateral stresses Fc exerted on the second carrier element 03. These unilateral stresses Fc give rise to unilateral deformation of the carrier element 03. This in turn leads to the guiding contact 18c becoming detached on one side, thus producing a gap. In return, the third guiding contact is brought into abutment 20c. Thus, it is rendered apparent that it is particularly advantageous to make provision for a third guiding contact 20 by means of which stresses being additionally exerted on a carrier element 02, 03 can be absorbed. Moreover, it is possible to thereby ensure that the linear guide constantly provides an acceptable amount of frictional force. Thus, displaceability in the linear guide is constantly realized in spite of the additional unilateral stresses being exerted.

Figure 4:
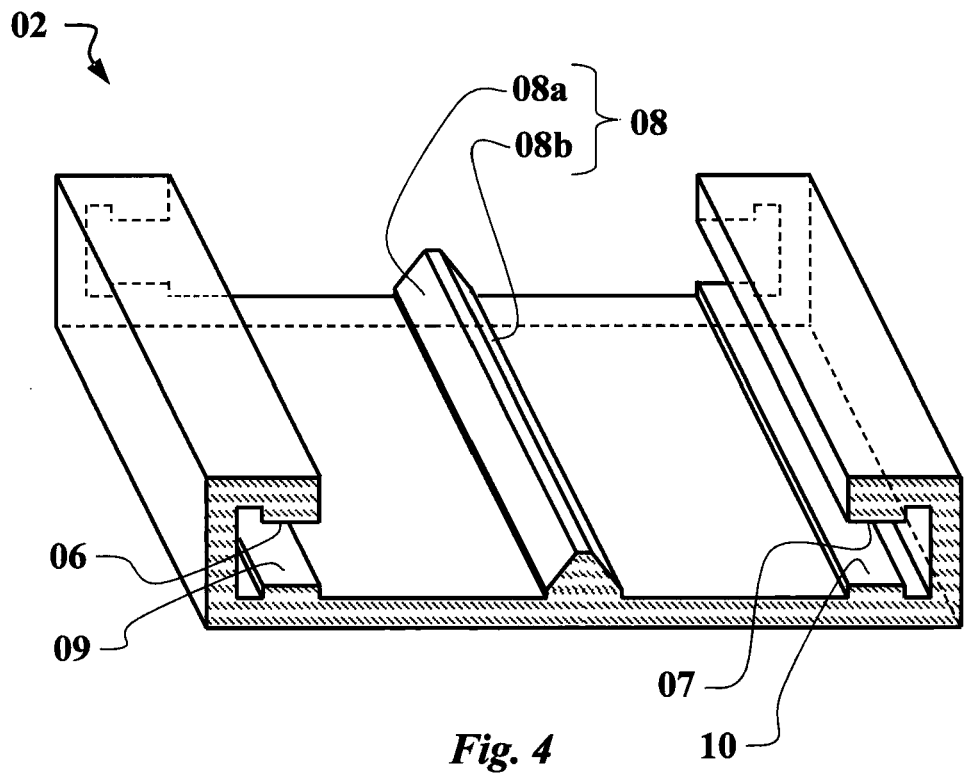
FIG. 4 shows the first carrier element 02 of the embodiment according to FIG. 1.

FIG. 4 illustrates the first carrier element 02 of the embodiment according to FIG. 1. As is readily apparent, this first carrier element initially comprises two first guiding surfaces 06 and 07, the second guiding surface 08 comprising the partial surfaces 08a and 08b as well as the third guiding surfaces 09 and 10. Here, it is discernible that the first guiding surfaces 06, 07 and the third guiding surfaces 09, 10 in this exemplary embodiment each lie in one plane and are aligned in parallel and opposite to each other. The second guiding surface 08 by contrast defines a V-shape. This primarily serves the purpose of ensuring centering of the carrier elements 02, 03 with respect to each other. In addition, at the same time lateral guidance transversal to the moving direction is realized.

Figure 5:
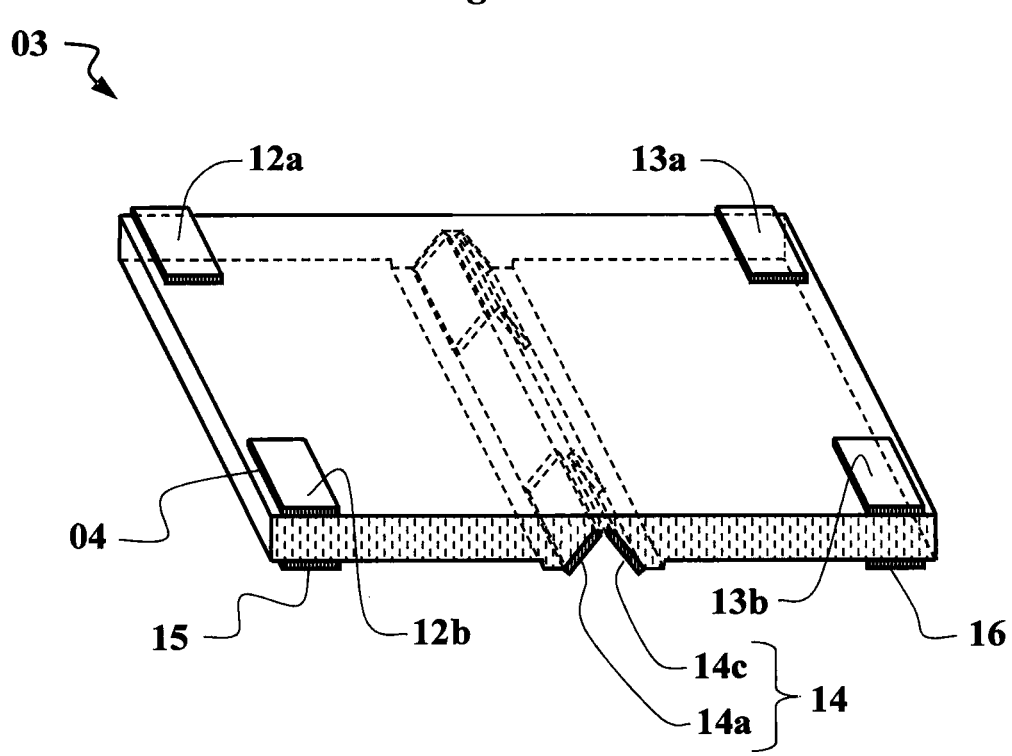
FIG. 5 shows the second carrier element 03 of the embodiment according to FIG. 1.

FIG. 5 shows the second carrier element 03 of the embodiment according to FIG. 1. It is apparent that the carrier element 03 is initially composed of a base body and a plurality of sliding pads 04. Each of said sliding pads 04 forms a section of the respective abutment surfaces 12-16. As is apparent, each abutment surface 12-16 is composed of two sections, e.g. 12a and 12b. Corresponding to the planar alignment of the first and the third guiding surfaces 06, 07, 09 and 10, the abutment surfaces 12, 13 as well as 15 and 16 are each correspondingly arranged in one plane. The second abutment surface 14 exhibits the complementary shape to the second guiding surface 08 and is in turn composed of several partial surfaces 14a-14d.

Fitting the first carrier element 02, illustrated in FIG. 4, together with the second carrier element 03, illustrated in FIG. 5, is only possible by deforming at least one carrier element 02, 03. In this process, as previously illustrated in FIG. 2, the first abutment surfaces 12, 13 are brought into abutment against the first guiding surfaces 06 and 07 and the second abutment surface 14 is brought into abutment against the second guiding surface 08. When no additional stresses are exerted, a gap is produced between the third abutment surface 15, 16 and the associated third guiding surface 09 and 10.

From FIGS. 1 to 5 the inventive embodiment is thus rendered apparent to the person skilled in the art using this schematically illustrated example. In terms of the inventive effect and design, it is irrelevant which carrier element is affixed to the vehicle and which carrier element is arranged so as to be longitudinally displaceable. In the practical implementation, this decision will be contingent for instance upon aspects of optical design.

Moreover, it is apparent that the person skilled in the art is enabled to vary the lengths and dimensions and to correspondingly determine the configuration of the carrier elements as well as of the individual guiding surfaces according to the respective requirements. As a general rule, the design will be such that, contrary to the view illustrated in FIG. 4 in comparison with FIG. 5, the first carrier element 02, in terms of the guide lengths, will be much larger than the length of the abutment surfaces, i.e. in the exemplary embodiment of FIG. 5 the length of the carrier element 03.

An example of a center arm rest 22 renders apparent a possible embodiment of the inventive device with the linear guide. Said center arm rest 22 is illustrated in FIG. 6 and comprises an arm support 23 which at the same time serves as the first carrier part and comprises a swivelable console 25. Using the linear guide, the arm support 23 is longitudinally displaceable relative to the swivelable console 25. The clamping effect thus produced ensures that the arm support 23 is not allowed to become displaced relative to the console 25 without any intervention on the part of the driver, respectively the passenger.

Figure 7:
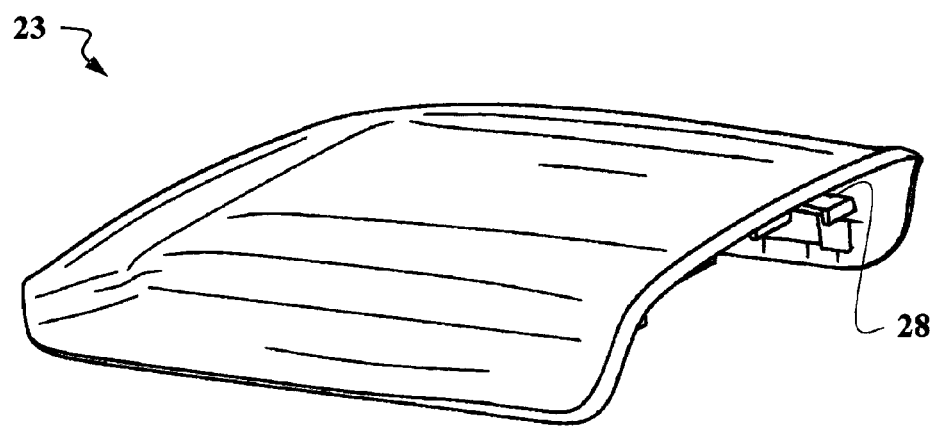
FIG. 7 shows the arm support 23 of the center arm rest 22 according to FIG. 6.

FIG. 7 shows the arm support 23 according to the embodiment of FIG. 6. A first guiding surface 28 which, just like the other first, second and third guiding surfaces 27, 29 to 31 (concealed, not discernible), continuously extends largely over the entire length of the arm support 23, is partly illustrated. It is obvious that the illustrated arm support is provided with a cover and, where appropriate, with a cushioning to ensure the required comfort.

FIG. 8 according to the example of FIG. 6 shows the swivelable console 25 having the second carrier part 24 fixedly mounted thereto. Although in this exemplary embodiment the second carrier part 24 and the swivelable console 25 constitute two separate components, it is obvious for the person skilled in the art that the same can also be produced integrally as one component. Thus, it is not essential to mount the second carrier element 24 at a console 25, but rather it may form a part of a console.

FIG. 9 schematically illustrates the second carrier part 24 according to the embodiment of FIG. 6, respectively FIG. 8. The respectively first abutment surfaces 33 and 34 on the side facing downward as well as the second abutment surface 35 configured in a V-shape, and further the third abutment surfaces 36 and 37 are discernible. It is again apparent in this exemplary embodiment that the abutment surfaces 33 to 37 are formed by sliding pads 26, wherein corresponding to the first and the third guiding surfaces 27, 28, respectively 30, 31, the first and the third abutment surfaces 33, 34, respectively 36, 37, lie in one plane. By the same token, it is again rendered apparent that each abutment surface 33 to 37 may be composed of a plurality of individual partial surfaces, e.g. 33a and 33b.

Finally, FIG. 10 schematically illustrates the swivelable console 25 as a component on which the second carrier element 24 is mounted.

LIST OF REFERENCE NUMERALS

01 Device
02 First carrier element
03 Second carrier element
04 Sliding pads
05
06 First one of two first guiding surfaces
07 Second one of two first guiding surfaces
08 Second guiding surface
08a, b Partial surfaces of second guiding surface
09 First one of two third guiding surfaces
10 Second one of two third guiding surfaces
11
12 First one of two first abutment surfaces
13 Second one of two first abutment surfaces
14 Second abutment surface
15 First one of two third abutment surfaces
16 Second one of two third abutment surfaces
18a First guiding contact with overlap
18b First guiding contact upon abutment
18c First guiding contact with gap
19a Second guiding contact with overlap
19b Second guiding contact upon abutment
20b Third guiding contact with gap
20c Third guiding contact upon abutment
21
22 Center arm rest
23 Arm support/first carrier part
24 Second carrier part
25 Swivelable console
26 Sliding pad
27 First one of two first guiding surfaces
28 Second one of two first guiding surfaces
29 Second guiding surface
30 First one of two third guiding surfaces
31 Second one of two third guiding surfaces
32
33 First one of two first abutment surfaces
34 Second one of two first abutment surfaces
35 Second abutment surface
36 First one of two third abutment surfaces
37 Second one of two third abutment surfaces

The invention claimed is:

1. A device for use in the interior of a vehicle, said device comprising:
    a first carrier element having two linearly extending first guiding surfaces;
    a second carrier element having two first abutment surfaces, wherein the first and second carrier elements are longitudinally displaceable relative to each other when the abutment surfaces slide along the guiding surfaces; and
    a linear guide contacting the first and second carrier elements, wherein the linear guide produces a clamping effect which prevents self-actuated displacement of at least one of said carrier elements due to vehicle movements, said linear guide including a second guiding surface associated with the first carrier element and a second abutment surface associated with the second carrier element, said second guiding surface being parallel to and spaced from said first guiding surfaces, wherein, when the first and the second carrier elements are fitted together, elastic deformation of at least one of the first and the second carrier elements is realized at least in some regions, causing the first and the second abutment surfaces to be pressed against the first and the second guiding surfaces.

2. The device according to claim 1, in which in a geometric model of the carrier elements prior to deformation, a first abutment surface overlaps with the first guiding surface upon abutment of the second abutment surface against the second guiding surface.

3. The device according to claim 1, in which the first guiding surfaces are essentially planar.

4. The device according to claim 1, in which the second guiding surface is of a one-piece or else multi-piece design having a shape selected from the group consisting of a V-shape, a trough shape, and a shape complementary to said second abutment surface.

5. The device according to claim 1, in which two planar partial surfaces defining an angle with respect to each other form the second guiding surface.

6. The device according to claim 1, in which the carrier elements are substantially completely composed of plastics.

7. The device according to claim 1, in which the first carrier element is composed of a uniform plastic material.

8. The device according to claim 1, in which each abutment surface is formed by at least one sliding pad.

9. The device according to claim 1, in which the linear guide includes a third guiding surface, and a third abutment surface, wherein the first and the third guiding surfaces have a primarily opposed alignment.

10. The device according to claim 9, in which the third abutment surface is allowed to come into contact with the third guiding surface when unilateral stresses are exerted on at least one of the first carrier element and the second carrier element.

11. The device according to claim 1, in which a gap of between 0.1 mm and 0.5 mm is present between the third guiding surface and the respective third abutment surface when no additional stresses are exerted on the carrier elements.

12. A center arm rest having a device according to claim 1.

13. The device according to claim 1, in which the first guiding surfaces lie substantially in a common plane.

14. The device according to claim 1, in which said second guiding surface is interposed between said first guiding surfaces.

* * * * *